Feb. 25, 1964   B. N. HOFFSTROM   3,122,220
HYDROKINETIC BRAKE ASSEMBLY
Filed July 20, 1960   7 Sheets-Sheet 1
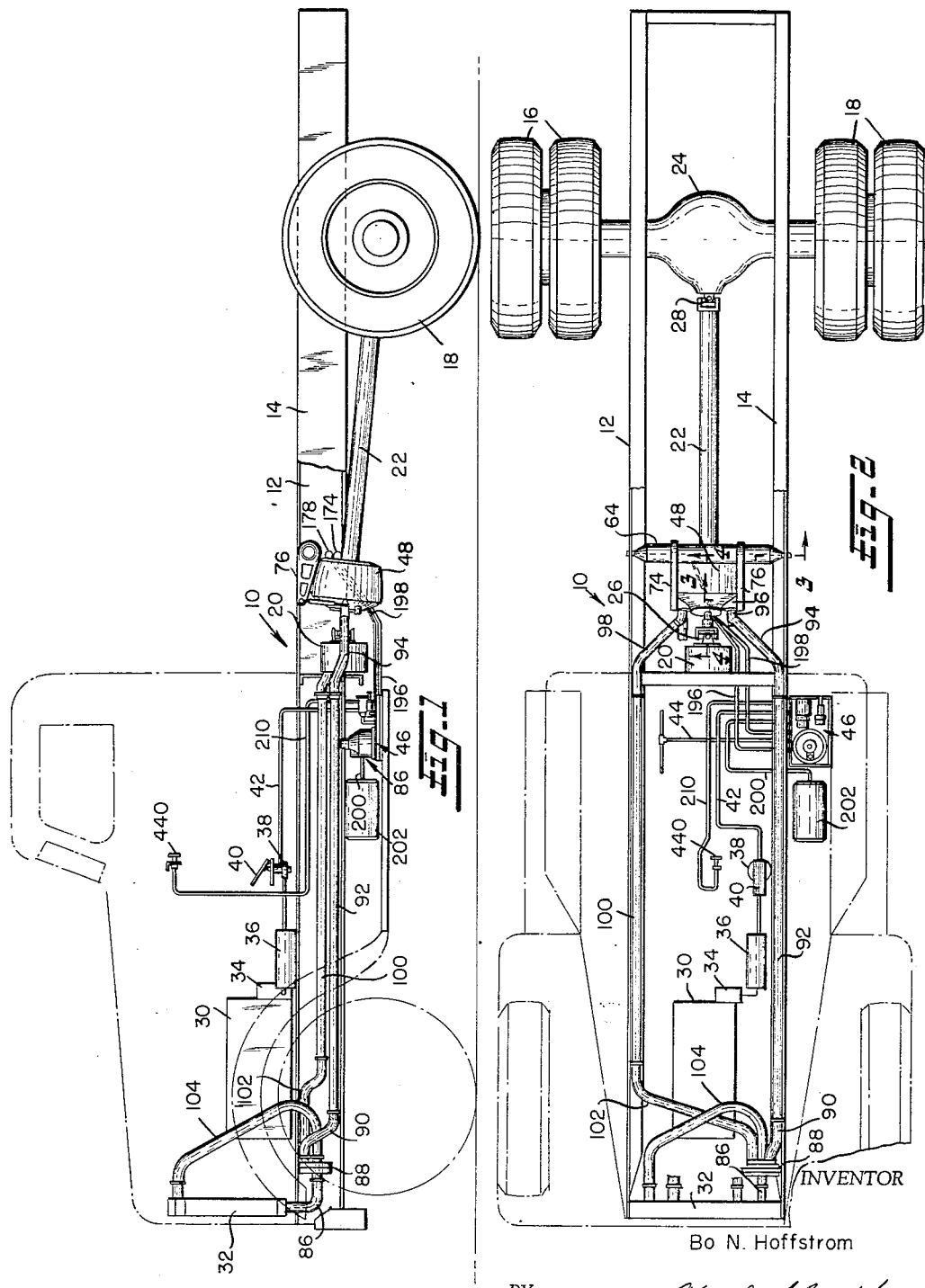
INVENTOR
Bo N. Hoffstrom
BY
ATTORNEYS

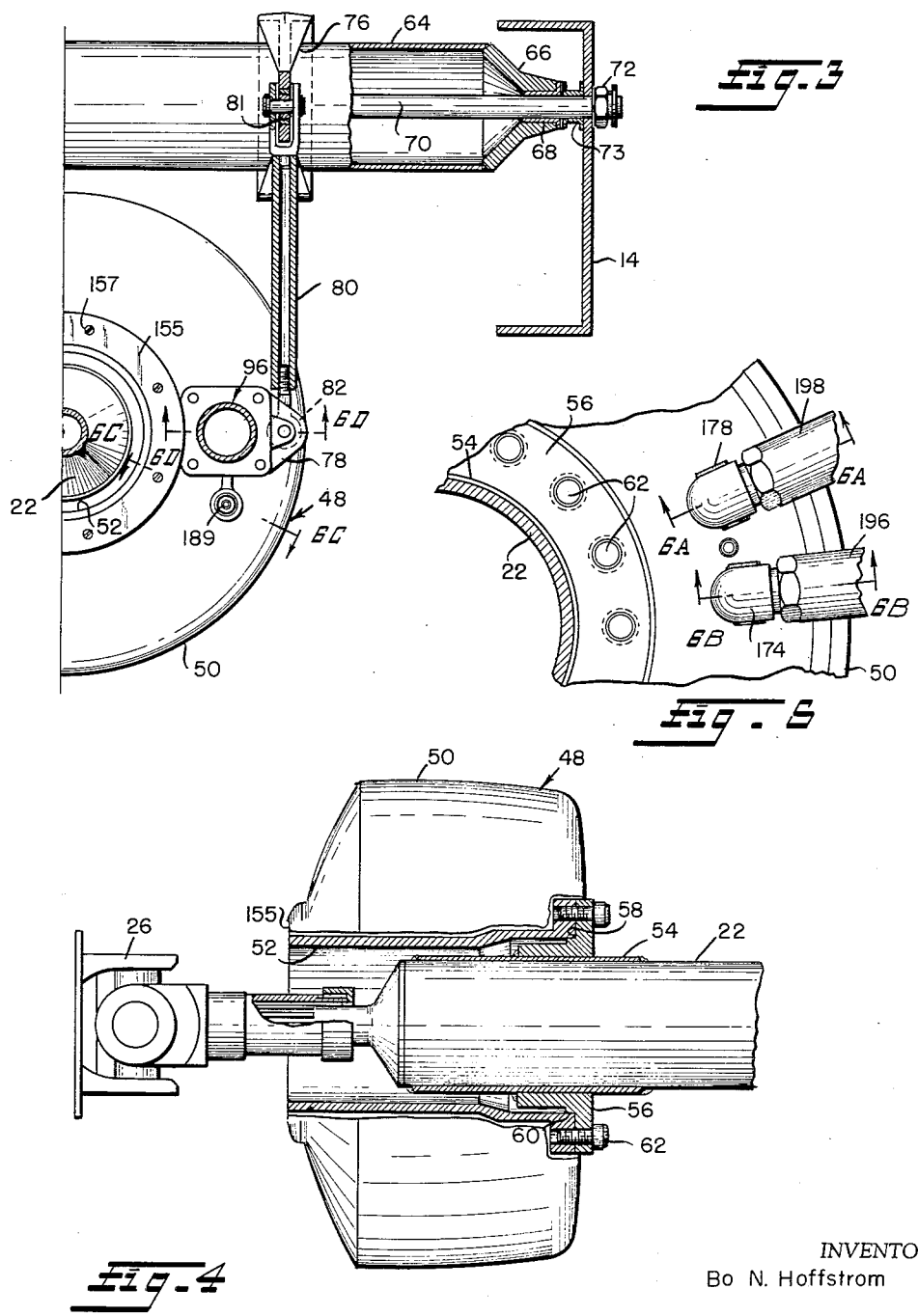

Feb. 25, 1964  B. N. HOFFSTROM  3,122,220
HYDROKINETIC BRAKE ASSEMBLY
Filed July 20, 1960  7 Sheets-Sheet 3

INVENTOR
Bo N. Hoffstrom

BY Strauch, Nolan + Neale
ATTORNEY

Feb. 25, 1964    B. N. HOFFSTROM    3,122,220
HYDROKINETIC BRAKE ASSEMBLY
Filed July 20, 1960    7 Sheets-Sheet 4
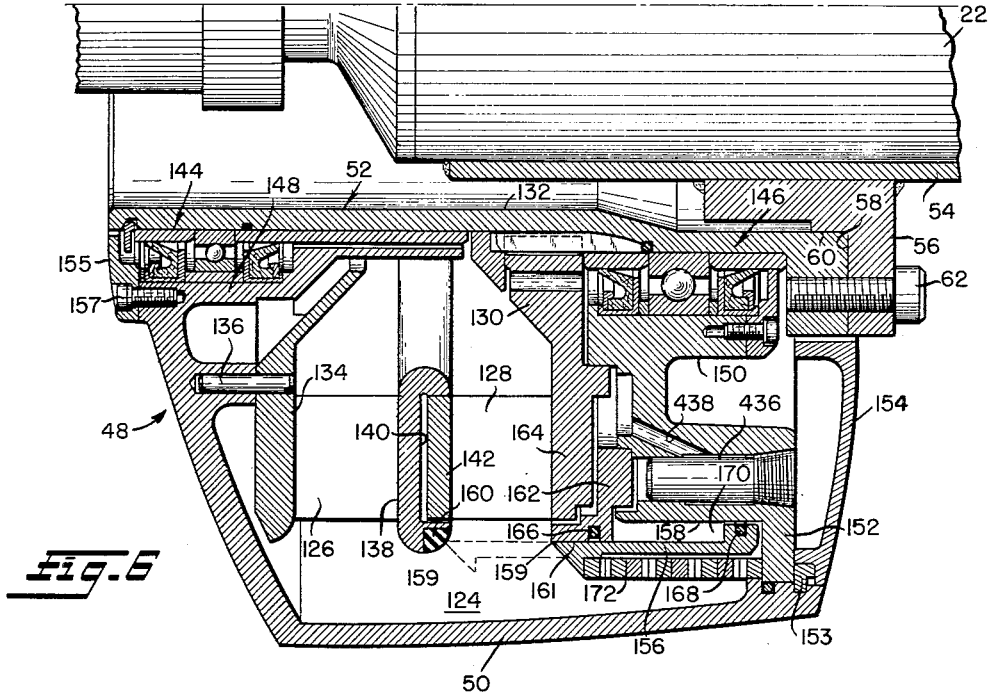
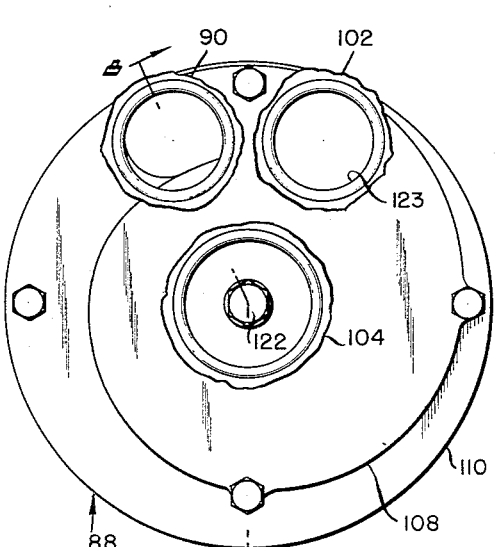
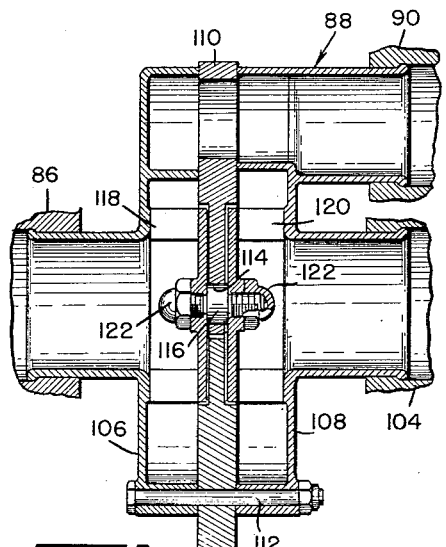
INVENTOR
Bo N. Hoffstrom
BY  *Strauch Nolan & Neale*
ATTORNEYS

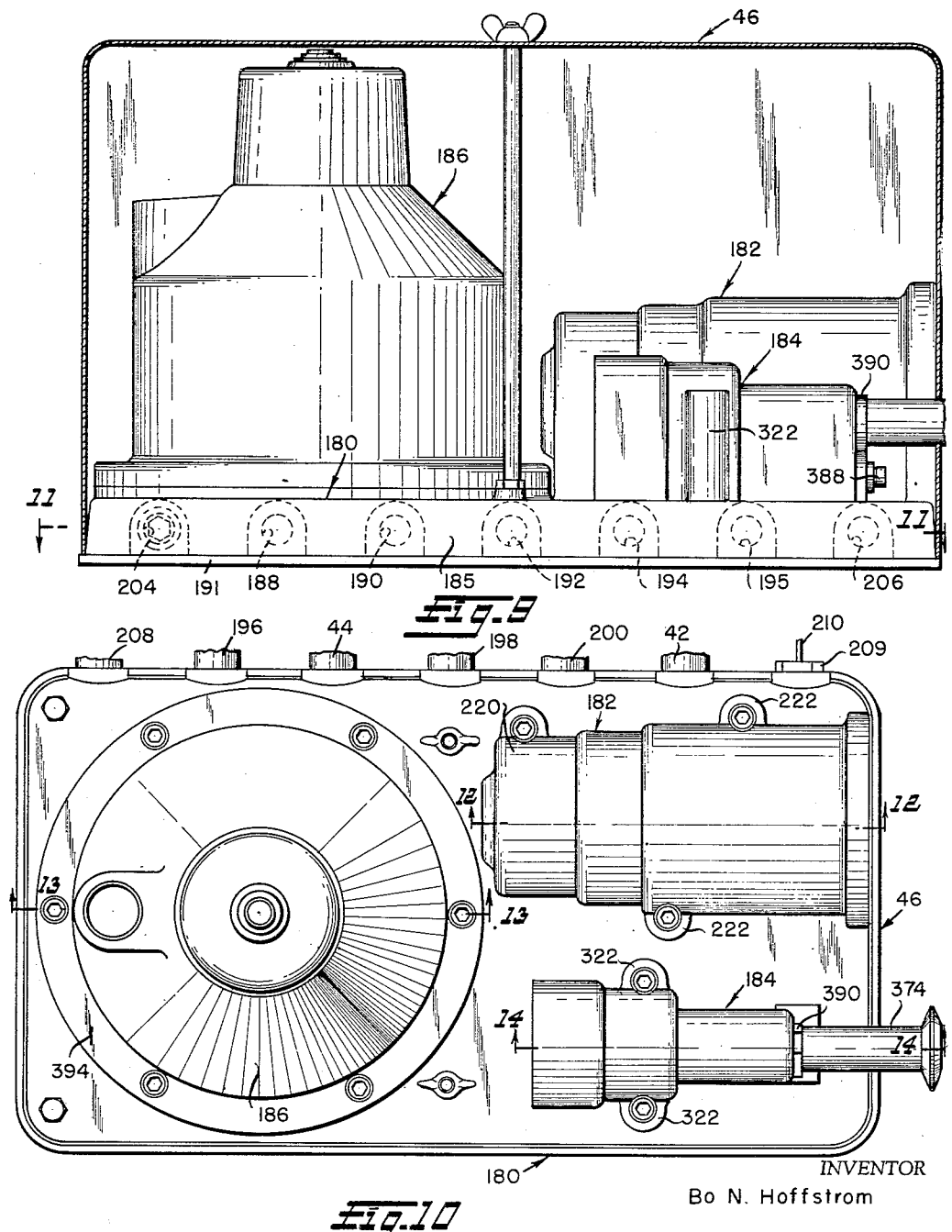

Feb. 25, 1964 B. N. HOFFSTROM 3,122,220
HYDROKINETIC BRAKE ASSEMBLY
Filed July 20, 1960 7 Sheets-Sheet 6

INVENTOR
Bo N. Hoffstrom

BY Strauch, Nolan & Neale
ATTORNEYS

Feb. 25, 1964     B. N. HOFFSTROM     3,122,220
HYDROKINETIC BRAKE ASSEMBLY
Filed July 20, 1960     7 Sheets-Sheet 7

INVENTOR
Bo N. Hoffstrom
BY
ATTORNEY

United States Patent Office 3,122,220
Patented Feb. 25, 1964

3,122,220
HYDROKINETIC BRAKE ASSEMBLY
Bo N. Hoffstrom, 1707 Clover Field Blvd.,
Los Angeles, Calif.
Filed July 20, 1960, Ser. No. 44,057
6 Claims. (Cl. 188—90)

This invention relates to brake systems and more particularly to brake systems in which the total braking action is derived from two types of braking apparatus.

Brakes which are employed on vehicles, hoists, elevators and many other types of machinery have two primary functions. One function is to hold a movable object such as a vehicle or cable drum stationary and the second function is to provide a retarding force when the device is in motion. The first of these functions can be accomplished by friction brakes or by suitable locking devices. The second function can be accomplished by friction brakes, electrical brakes or hydrokinetic brakes. Since only the friction brake is capable of performing both of these functions, friction brakes are now in universal use for automotive applications.

However when friction brakes are used to perform a retarding function, they are subject to rapid wear under normal operating conditions and subject to failure under emergency conditions.

As is well known, friction brakes function by converting input energy (which equals retarding force times velocity) to heat. Since the ability of friction brakes to dissipate this heat is severely limited, over-heating with resulting partial or complete loss of braking effectiveness often results as input energy goes up when the need for braking effect is greatest.

For example, it is well known that the speed of a heavy vehicle such as a tractor trailer combination travelling down a relatively steep grade for an extended period of time cannot be controlled by the conventional friction brake system except at very low speeds. Two factors are principally responsible for this condition. For a given vehicle weight and grade, brake energy released is proportional to speed. This braking energy is supplied both by the engine and by the normal friction brakes. Under conditions of severe load, engine friction torque corresponds only to a very small part of the total braking effort required. The remaining braking effort must be supplied by the normal friction brakes. While it is a relatively simple matter to design such brakes with sufficient torque capacity to provide the total braking effort, the effectiveness of the brakes is limited by their heat dissipation capacity which does not increase appreciably with an increase in the speed of the vehicle. Thus as the speed of the vehicle goes up, the energy input goes up and at a relatively low level of energy input heat is developed in the brake faster than it can be dissipated. Accordingly the temperature of the brakes increases, accompanied by a decrease in the coefficient of the friction between the brake linings and drum. If maximum brake pressure is applied without effecting a reduction in speed, the brake torque begins to drop, the speed remains constant or may increase, the level of energy input either remains constant or increases, the brake temperature thus increases and the speed of the vehicle can no longer be controlled with results which are often disastrous.

Accordingly, many attempts have been made to replace friction brakes with other types of brakes to provide greater reliability, durability and safety. The electrical brakes which have been proposed are heavy and expensive and require a complicated control system. Their use is therefore limited to special cases, for example in street cars where the presence of other electrical equipment makes their use practical. Prior hydrokinetic brakes cannot be controlled with the speed and precision required in most brake applications. Accordingly, prior to the present invention friction brakes have continued to be used practically universally despite their notorious disadvantages.

With these considerations in mind, it is a primary object of the present invention to provide a novel dual brake system that integrates the function of the novel hydrokinetic brake with that of one or more friction brakes in such a manner that the hydrokinetic brake is effective to supply the primary retarding force and the friction brakes are effective to supply a limited retarding force and the entire holding force and where the shift from one brake to the other is smooth, gradual and fully automatic.

In accordance with the present invention the integration of the normal friction brake system with the hydrokinetic brake is such that the hydrokinetic brake is always called upon first to supply the total braking effort. The friction brakes are actuated only to supply the braking effort when the capacity of the hydrokinetic brake has been exceeded. In practice the hydrokinetic brake performs substantially all of the braking involving release of energy and the normal friction brakes are employed only for low energy braking and for holding. For example, in an average operation over a period of time, the hydrokinetic brake will absorb 90–95% of all the braking energy released, the remaining 5–10% being absorbed by the normal friction brakes. Since the wheel brake lining life is essentially a function of the total energy absorbed by it, the dual braking system of the present invention effectively increases the life of the brake linings from 10–20 times.

The capacity of the hydrokinetic brake of the present invention is sufficient to control the vehicle even on the steepest grade without assistance from the engine or from the normal friction brakes. In a typical case it is effective to limit the speed of the vehicle to a maximum of about 15 m.p.h. on the steepest grade over which the vehicle operates. Because of the unique operation of the dual brake system of the present invention, the vehicle may be operated at considerably greater speeds over steep grades, for example 40–50 m.p.h., since the torque capacity of the hydrokinetic brake increases with an increase of speed. The capacity of the hydrokinetic brake under these conditions is determined only by the design of the vehicle components such as the propeller shaft, the rear axles and by the heat dissipating capacity of the vehicle radiator, each of which can be designed at little cost to provide sufficient braking capacity to permit safe operation of the vehicle at any desired speed.

It is a further object of the present invention to provide improved dual brake systems that can be installed readily in existing equipment, which allow the use of existing control input apparatus such as the normal brake pedal in a vehicle and which permit the use of existing heat dissipating systems such as the existing water cooling system in automotive applications.

It is also an object of the present invention to provide improved dual brake systems which are light, efficient and safe and which require a minimum of energy to be absorbed by the friction brakes.

It is a further object of the present invention to provide improved dual braking systems which automatically protect existing machine elements such as automotive drive shafts from damage due to overloading.

It is a further object of the present invention to provide improved braking systems for automotive vehicles in which the action of the normal friction brakes is integrated with the action of the novel hydrokinetic brake in such a manner that each brake performs only the function for which it is best suited, and in which the braking action is controlled only by the brake pedal normally used to operate the usual friction brakes.

It is also an object of the present invention to provide novel control systems for integrating the function of friction brakes and hydrokinetic brakes which operate automatically to assure optimum performance of each type of brake while permitting control of the brakes by the vehicle operator in the normal manner.

It is a more specific object of the present invention to provide improved hydrokinetic brake mechanisms and control systems therefor which are installed in a vehicle having normal friction brakes and which permit the normal fritcion brakes to operate in the usual manner in the event of failure of the hydrokinetic brake for any reason.

Additional objects and advantages of the present invention will become apparent as the description proceeds in connection with the accompanying drawings in which:

FIGURE 1 is a side elevation of a truck-tractor in which the dual brake system of the present invention is installed;

FIGURE 2 is a top plan view of the unit of FIGURE 1;

Figures 6A, 6B:
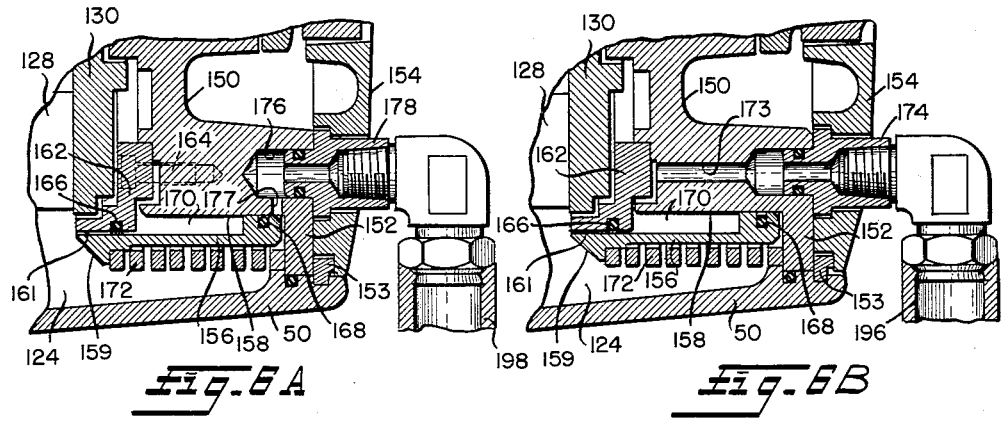
Figures 6C, 6D:
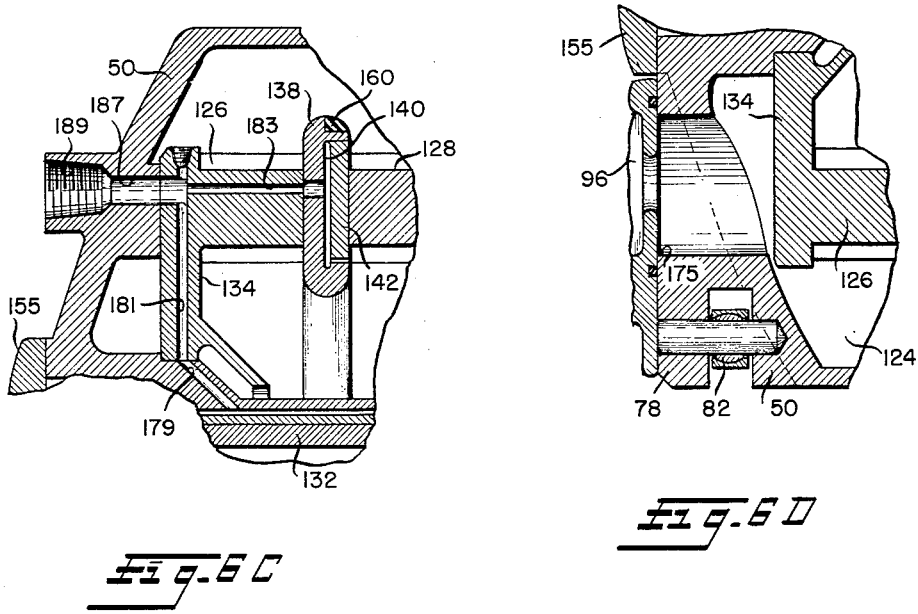
Figure 11:
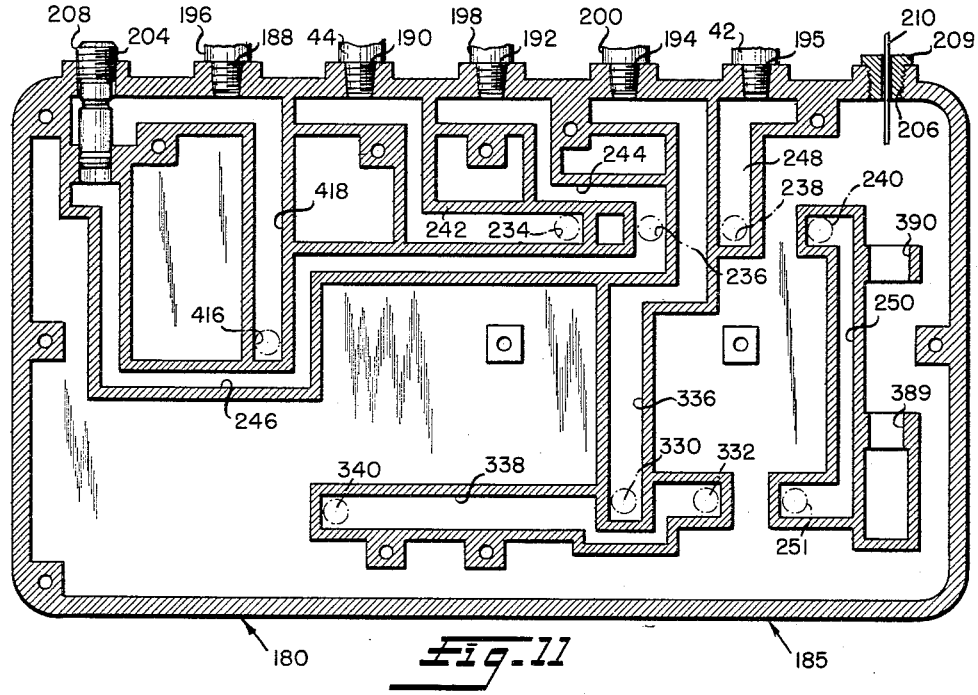
Figure 12:
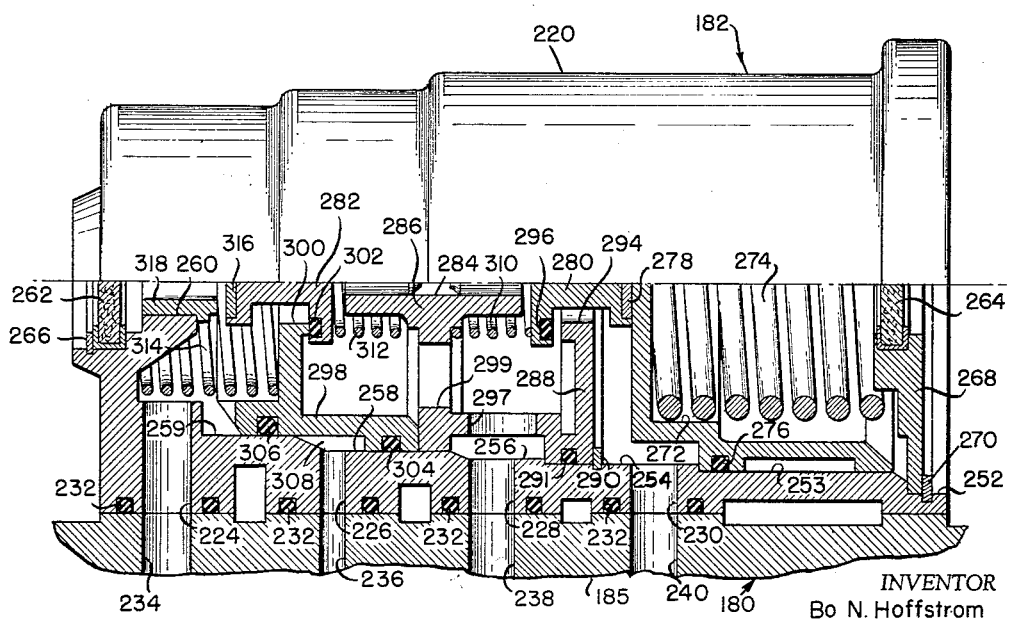
Figures 13, 14:
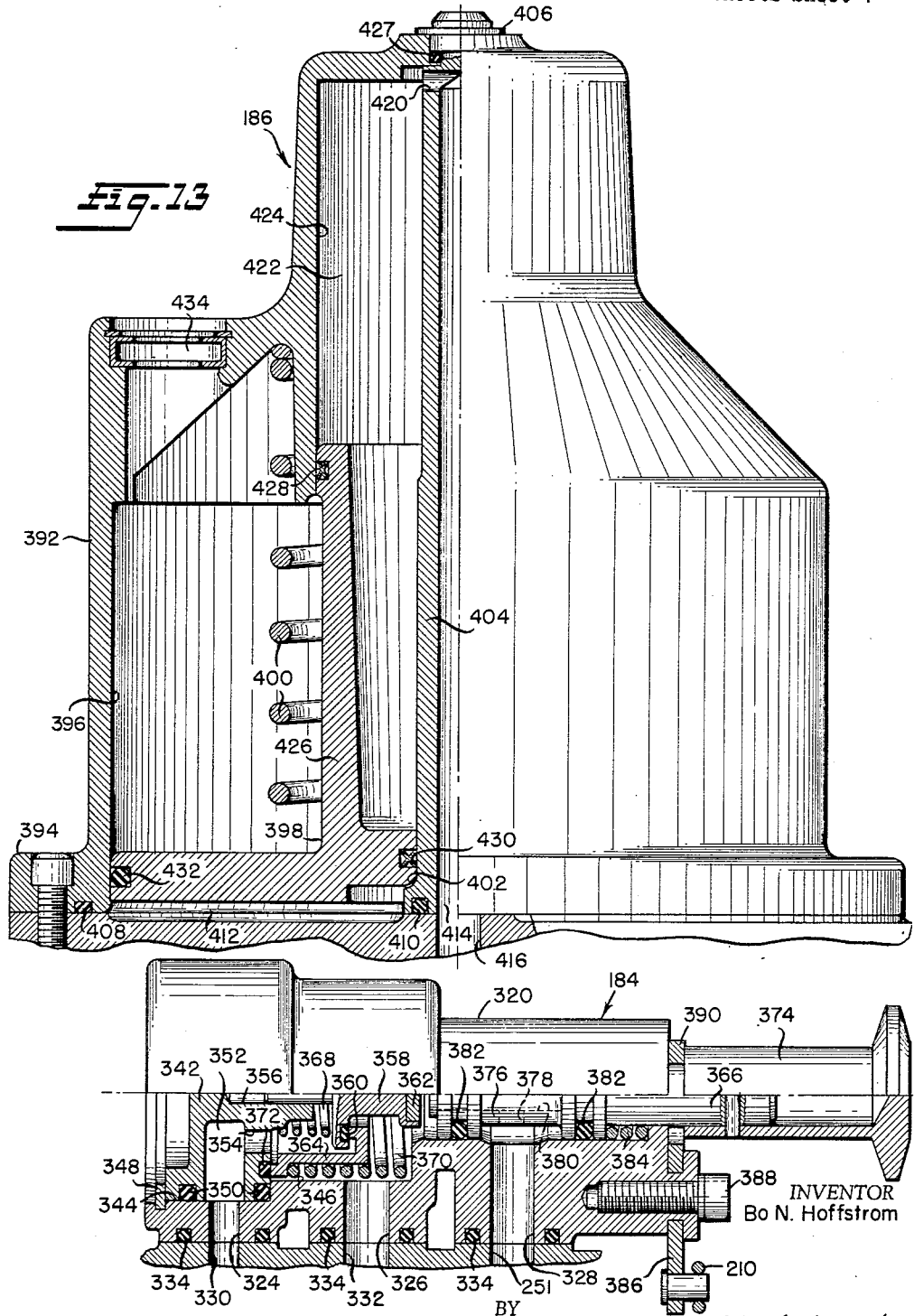

FIGURES 3 and 4 are enlarged fragmentary sections taken along lines 3—3 and 4—4 of FIGURE 2 showing details of the mounting of the hydrokinetic brake unit and its attachment to the truck propeller shaft;

FIGURE 5 is a fragmentary rear view of the hydrokinetic brake;

FIGURE 6 is a fragmentary central vertical section of the hydrokinetic brake assembly;

FIGURES 6A and 6B are fragmentary sections taken along lines 6A—6A and 6B—6B respectively of FIGURE 5 showing details of construction of the brake;

FIGURES 6C and 6D are fragmentary views similar to FIGURES 6A and 6B taken along lines 6C—6C and 6D—6D respectively of FIGURE 3;

FIGURE 7 is a rear elevation of a turbo-pump unit for supplying water under pressure to the hydrokinetic brake;

FIGURE 8 is a section taken along line 8—8 of FIGURE 7;

FIGURES 9 and 10 are a side elevation and top plan view respectively of the control unit for the dual brake system;

FIGURE 11 is a horizontal section of the base member of the control unit taken along line 11—11 of FIGURE 9; and FIGURES 12, 13 and 14 are enlarged half-sections of the principal components of the control units taken along the respective lines 12—12, 13—13 and 14—14 of FIGURE 10.

While, as stated above, the brake system of the present invention has wide application and may be used in a number of environments, many of its unique advantages have proved most beneficial when the system is installed as a vehicle brake system. Accordingly, for present purposes the disclosure will be directed primarily to a dual brake system installed in a heavy duty truck or tractor.

Referring now more particularly to the drawings, FIGURES 1 and 2 illustrate the dual brake system of the present invention applied to a truck-tractor 10 of conventional construction having a main frame including side members 12 and 14, rear wheels 16 and 18, which are driven in the usual manner through a transmission 20, propeller shaft 22 and differential 24, the propeller shaft 22 being provided with universal joints 26 and 28 at its front and rear ends, respectively. The truck is also provided with an internal combustion engine 30 which is cooled by the usual radiator 32. The usual fifth wheel for supporting the trailer has been omitted for clarity.

The truck is also provided with air actuated friction brakes which are wholly conventional and are omitted from the drawings for clarity. Air pressure for operating the brakes is derived from an engine driven air compressor 34, the output side of which is connected to the usual storage tank 36. A conventional air brake valve 38 operated by the usual brake pedal 40 is provided to control the total braking action of the dual brake system of the present invention. In the absence of the present invention, the pressure line 42 leading from the valve 38 would be connected directly to the pressure line 44 connected to the individual brake cylinders. However when the novel dual brake system of the present invention is installed in a truck either at the time of manufacture or as an after-market installation, the normal connection between the pressure lines 42 and 44 is broken and is then re-established through a control unit indicated generally at 46 which forms one of the principal components of the system of the present invention and which will be described below in detail.

The hydrokinetic brake assembly, indicated generally at 48 which also forms an important component of the system of the present invention is of annular form and is mounted in surrounding relation to the propeller shaft 22 as best shown in FIGURES 3 and 4. Essentially the hydrokinetic brake unit 48 comprises an outer casing 50 which is held against rotation, an inner rotor assembly 52 which is rotatable with the propeller shaft 22, and internal mechanism described in detail below which is effective to establish a variable drag on the rotor 52 which is transferred through the propeller shaft 22 to the rear wheels 16 and 18 as a variable braking force.

The hydrokinetic brake assembly is installed in the same manner as original factory equipment or as an after-market installation. In either case no substantial modification of the standard truck components is required.

The only modification of the existing propeller shaft 22 is the addition of a sleeve 54 which is welded to the forward end of the propeller shaft and carries a mounting flange 56. After installation of the flange 56, its radial and cylindrical surfaces 58 and 60 are machined to final dimensions with the propeller shaft 22 set between centers to assure that these surfaces are concentric and square with the propeller shaft center-line. The mating surfaces on the hydrokinetic brake rotor assembly 52 are also concentric and square and the brake will thus be accurately lined up with the propeller shaft center-line when the attaching bolts 62 are installed and tightened. The bolts 62 also transmit from the hydrokinetic brake assembly 48 to the propeller shaft 22 all of the torque developed by the former.

Since the propeller shaft 22 in normal operation moves vertically, laterally and fore and aft in the normal operation of a truck, the hydrokinetic brake 48 necessarily follows these motions. However in order for the assembly to apply torque to the propeller shaft, the housing 50 must be held against rotation. This function is performed by the torque retention system shown in FIGURE 3. This system comprises a torque tube 64 which extends transversely of the truck frame and is provided with end fittings 66 containing radial and axial thrust bearings 68 which encircle a mounting rod 70 the opposite ends of which are secured to the side frame members 12 and 14 by nuts 72. Appropriate end spacers 73 are provided as necessary. Welded to the torque tube 64 are two torque arms 74 and 76 which are spaced to match attaching lugs 78 formed integrally with the brake housing 50. The free ends of the torque arms and the lugs on the brake housing are connected by links 80. Spherical bearings 81 and 82 of conventional construction are provided at the opposite ends of the links. Thus this torque retention system provides freedom for the brake housing 50 to follow the movements of the propeller shaft while it is restrained from rotation.

The operating fluid for the hydrokinetic brake 48 is water. While this water may be supplied from any source, the hydrokinetic brake is preferably connected in a closed circuit to the vehicle radiator 32. This water circuit comprises a flexible conduit section 86 which leads from the bottom of the radiator 32 to the inlet side of a turbo-pump 88, the outlet side of the pump 88 being connected by a flexible hose section 90 to a main conduit 92 connected in turn by a flexible hose section 94 to an inlet fitting 96 on the brake housing 50. The water is returned to the radiator through a flexible hose section 98 connected to a suitable outlet fitting not shown identical to the inlet fitting 96 thence through a main conduit 100 which is connected by a flexible section 102 to the turbine unit of the turbo-pump 88, the outlet side of which is connected to a final flexible return line 104 leading to the top of the radiator 32.

As best shown in FIGURES 7 and 8, the turbo-pump unit 88 comprises housing sections 106 and 108 and a center divider plate 110, the parts being held in assembled relation by through bolts 112. The divider plate 110 is provided with a central opening 114 which forms a journal for the shaft 116 and the rotor assembly having a pump impeller 118 and a turbine 120, these components being non-rotatably secured to the shaft by nuts 122.

As explained in detail below, when the hydrokinetic brake 48 is used, pressure and flow build up in the discharge line 98. This water under pressure is delivered through conduit 102 to the turbine inlet 123. The water passes through the turbine thus driving the turbine and is returned to the radiator through the conduit 104. Thus the pump 118 is driven supplying water under slight pressure, for example 2 p.s.i., to the inlet fitting 96 of the hydrokinetic brake. The unit 88 is included in the system to prevent vapor lock and permit the hydrokinetic brake to function at a higher water temperature than would be otherwise possible. This in turn increases the heat which can be carried away by the water and dissipated in the radiator 32 and thus increases the capacity of the hydrokinetic brake.

The hydrokinetic brake assembly 48 is preferably of generally the same form disclosed and claimed in copending application Serial No. 122,307 filed June 6, 1961, for Power Absorbing Systems and Components.

Essentially the unit employs a vortex type recirculating internal flow in which the direction of rotation of the circulating fluid is reversed twice during each pass, once by a set of stationary vanes and once by a set of rotary vanes. As explained more fully in the aforesaid copending application Serial No. 122,307, the energy imparted to the water as its velocity is increased within the unit develops a retarding torque on the rotor assembly, the torque being a function of the rotor speed. The mechanism is effective to form a vortex having a core with the steep pressure gradient from its inner region toward the outer rim or periphery to thus generate conditions which prevent cavitation of the fluid in the areas where the rotor and stator blades are located.

As best shown in FIGURE 6, the main housing member forms a working chamber 124 in which a set of stator blades 126 and a set of rotor blades 128 are mounted. These blades are of the form shown in the aforesaid copending application Serial No. 122,307. The rotor blades 128 are formed integrally with an annular plate-like member 130 splined to the central rotor tube 132. The stator blades are formed integrally with a similar plate-like member 134 secured by pins 136 to the housing member 50. The opposite ends of the stator blades 126 are rigid with an annular core member or ring 138 which is recessed as at 140 to accommodate an annular ring 142 rigid with the free ends of rotor blades 128. Suitable bearing and seal assemblies 144 and 146, respectively, are provided to support the rotor assembly 52 for rotation within the housing member 50. The bearing assembly 144 is supported by an axial flange 148 formed integrally with the housing member 50 and the bearing assembly 146 is supported by a separate annular member 150 having an outwardly projecting flange 152 clamped against the housing member 50 by a retaining ring 153. An end cover plate 154 is assembled by means of screws (not shown) to the housing member 50 to close the housing. The housing is closed at its opposite end by a cover plate 155 attached by screws 157.

An annular throttle ring 156 is mounted on an outer annular surface 158 of the member 150 for axial sliding movement between the fully open position shown in FIGURE 6 in which the capacity of the brake is a maximum and a fully closed position shown in dotted lines. In this latter position the forward edge 159 of the throttle ring engages a resilient insert 160 carried by the core 138. When the throttle ring is in this position the capacity of the brake is at its design minimum. The throttle ring 156 is also supported by a cylindrical surface 161 formed on a ring 162 secured by screws 164 (FIGURE 6A) to the ring member 150. Suitable seals 166 and 168 are provided to form an annular sealed control chamber 170, the pressure in which is established by the control unit 46 as explained in detail below. An annular spring 172 urges the throttle ring 156 to the left as viewed in FIGURE 6 against the balancing control pressure established in chamber 170. As shown in FIGURE 6B, the chamber 170 is in communication with the exterior of the brake unit through an internal drilled passage 173 which leads to a fitting 174 clamped between the cover plate 154 and the member 150.

As stated above, the main working chamber 124 is in communication with the water cooling system for the truck tractor engine through the two fittings 96. As shown in FIGURE 6D, fitting 96 surrounds an opening 175 in housing 50 which is in direct communication with the working chamber 124. Communication between the working chamber 124 and the exterior of the device is also established through radial passages 176 and 177 communicating with a fitting 178 clamped between the cover plate 154 and the member 150 (FIGURE 6A). As shown in FIGURE 6C, the regions of lowest pressure in the brake, i.e. at the rotor center and in the recess 140, are vented through internal passages 179, 181, 183 and 187 which connect or communicate with a threaded opening 189 in the housing 50. The opening 189 and a similar symmetrically placed opening (not shown) may be connected to the top of the radiator 32.

When the hydrokinetic brake is in operation the rotor blades 128 intercept a portion of the water which substantially fills the chamber 124 and drives the intercepted body of water tangentially of the chamber 124 with a velocity which soon becomes substantially greater than the velocity of the rotor blades. As the rotation of the blades continues, a vortex is formed with a central core and a steep pressure gradient is established between the center of the vortex rising to a maximum value at the circumferential outer surface or rim of the chamber 124. A portion of the fluid is caused to flow around the core member 138 into the region of the stator blade 126 where it is intercepted by these blades. The direction of the water is again reversed by the stator blades 126 and the water is again disposed in the path of the rotor blades 128 where its direction is again reversed. Thus the direction of rotation of the water is reversed twice during each pass, once by the stationary vanes and once by the rotary vanes.

Each time the fluid passes the rotor blades 128 its tangential velocity is increased by an amount proportional to the rotary speed of the vanes. The velocity of the fluid and the volume flow rapidly increase until the velocity gain in the rotor is exactly offset by frictional losses in the circuit with the result that a very high torque is produced for a given dimension. Throughout the operating cycle the tangential velocity of the water is many times higher than the velocity with which it passes around the core member 138.

For a further discussion of the operation of this unit, reference may be had to the aforesaid co-pending application Serial No. 122,307.

The heat generated in the unit is dissipated by the constant flow of water through the unit with the eventual delivery of the water to the main vehicle radiator 32 where it is cooled before being returned to the brake unit.

As explained in the aforesaid co-pending application Serial No. 122,307, this unit has a significant advantage over all known prior hydrokinetic power absorbing units or brakes in that its capacity can be controlled easily and precisely to provide a very wide range of retarding torque. The capacity is controlled by the throttle ring 156 which, depending upon its position, controls the rate of circulation of the water between the stator blades and the rotor blades. When the throttle ring occupies the position shown in dotted lines in FIGURE 6, it exerts a drag on the rotor assembly and on the propeller shaft 22 of not more than 2 or 3 horsepower. However when the throttle ring is fully retracted to the position shown in full lines, the brake is effective to exert a drag equivalent to several thousand horsepower.

The braking effectiveness of the hydrokinetic brake as well as the integration of its braking action with the action of the normal friction brakes is achieved by a control unit 46 to which detailed reference will now be made.

Essentially the control unit comprises a cast base assembly indicated generally at 180, FIGURE 11, a main control valve assembly indicated generally at 182, FIGURE 12, and an emergency control valve assembly indicated generally at 184, FIGURE 14, and a pressure multiplier indicated generally at 186 and shown particularly in FIGURE 13. As shown in FIGURES 9 and 10, the units 182, 184 and 186 are assembled in a compact group on the rectangular base assembly 180 which can be mounted at any convenient location within the truck.

The main body member of the base assembly 180 is a cast unit 185 having a plurality of passages which effectively connect the interiors of the units 182, 184 and 186 with one or more of the conduits connected to the side openings 188, 190, 192, 194 and 195. A closure plate 191 is brazed to the bottom of the member 185 to form a sealed unit. The opening 188 is connected through a conduit 196 and fitting 174 (FIGURE 6B) to the control chamber 170 of the hydrokinetic brake. The opening 190 is connected to the pressure line 44 to the actuating cylinders of the friction brakes. The opening 192 is connected through a pressure line 198 to a fitting 178 and is thus connected to the main working chamber 124. The opening 194 is connected through conduit 200 to an emergency pressure tank 202, the operation and purpose of which will be described. The opening 195 is connected to the pressure line 42 leading from the brake valve 38. Additional openings 204 and 206 are provided to accommodate a check valve 208 and a ferrule 209 through which an emergency trip cable 210 pases.

The control valve assembly 182 comprises a generally cylindrical housing member 220 having bosses 222 to receive bolts by which it is atached to the control base member 185. The bottom wall of the housing 220 is provided with openings 224, 226, 228 and 230, each surrounded by a machined flat having a groove to receive sealing O-rings 232. The top wall of the base assembly 180 is provided with openings 234, 236, 238 and 240 in register with the respective openings 224, 226, 228 and 230 in the housing 220 when the latter is installed. The opening 234 is in communication through an interior channel 242 with the opening 190 in communication with the line 44 leading to the air brake cylinders. The opening 236 is in communication through an interior channel 244 with the opening 192 leading to the main working chamber of the hydrokinetic brake. The opening 236 is also in communication through a channel 246 and the check valve 208 with the opening 188 connected to the throttle control chamber of the hydrokinetic brake, the check valve being so installed as to permit flow from the opening 236 to the opening 188 and to prevent flow in the reverse direction. The opening 238 is in communication through interior channel 248 with the opening 195 leading to the actuating air line 42. Finally the opening 240 is in communication through the interior channel 250 with an opening 251 leading to the interior of the emergency control valve 184 as explained in detail below. The various valve components within the housing 220 are mounted in stepped bores 252—260. At its opposite ends the housing member 220 is in communication with the atmosphere through filters 262 and 264, the former being held in place by a snap ring 266 and the latter being positioned in a central opening of an end plate 268 held in place in the bore 252 by a snap ring 270.

A piston 272 is slidably mounted in the bore 253 and is urged against the shoulder formed between bores 253 and 254 by a compression spring 274, the periphery of the piston 272 being sealed by an O-ring 276. The flat end face of the piston 272 forms a valve seat against which a sealing element 278 of an axially floating valve member 280 is adapted to seat. The valve member 280 and an identical oppositely directed valve member 282 are supported for axial movement in a central bore 284 in a ring member 286, a portion of which is clamped against the shoulder between the bores 254 and 256 by a ring member 288 held in place by a snap ring 290. The periphery of the member 288 is sealed by an O-ring 291 and the member is provided with a central opening 294 adapted to be opened and closed by the sealing member 296 carried by the valve member 280. The member 286 is provided with flow ports 297 and 299. A piston 298 having a central opening 300 which is adapted to be opened and closed by sealing member 302 carried by the valve member 282 is slidably received in bores 258 and 259, O-rings 304 and 306 being provided to seal the chamber 308 surrounding the piston 298 and in communication with the opening 226. The valves 280 and 282 are normally urged in opposite directions toward their limit position by respective coil springs 310 and 312 and the piston 298 is normally urged to its limit position shown in FIGURE 12 by a compression spring 314 considerably stronger than the opposing spring 312. The valve 282 is provided with a sealing member 316 which is adapted to seal against the end face of a cylindrical member 318 pressed into the bore 260. The components of the control valve assembly 182 are shown in the relative positions they occupy when the system is de-energized. All of the valves in this unit are actuated automatically by the balance of internal fluid pressures and the several springs as will be described in detail below.

The emergency control valve assembly 184 shown in detail in FIGURE 14 comprises an annular housing member 320 provided with bosses 322, which receive bolts for attachment to the control base member 185, and is formed on its lower surface with machine flats surrounding openings 324, 326 and 328. The unit is assembled to the base 185 with the openings 324, 326 and 328 respectively in register with openings 330, 332 and 251 which are also surrounded by machine flats. Sealing O-rings 334 are provided in surrounding relation with each of the openings. The opening 330 in the control base member 185 is in communication through an internal passage 336 with the opening 194 leading to the emergency air tank 202. The opening 332 is connected through an internal passage 338 with an opening 340 leading to the interior of the pressure multiplier 186.

The forward end of the housing 320 is closed by a plate assembly 342 held against the shoulder between internal bores 344 and 346 by a snap ring 348. Sealing rings 350 are provided at the opposite sides of an annular recess 352 in register with the passage 324 and in communication with the interior of the housing 320 through passages 354. An interior bore 356 in plate assembly 342 supports a floating valve 358 which carries sealing elements 360 and 362 respectively engageable with a second floating valve member 364 and the end of a plunger 366. The valve 358 is urged to the right as viewed in FIGURE 14 by a light spring 368 and the valve 364 is urged to the left by a heavier spring 370, the latter normally urging the valve 364 against a sealing member 372 on the plate assembly 342.

The plunger 366, which has a knob 374 at its outer projecting end for manual operation, is provided with a section 376 of reduced diameter opposite the port 328, the wall of the section 376 having radial passages 378 communicating with a central bore 380 so that fluid communication normally is established between the port 328 and the port 326. O-rings 382 are provided to seal the periphery of the plunger 366. The plunger is normally urged to the left as viewed in FIGURE 14 by a compression spring 384 and is held against such movement by a latch member 386 which is pivotally mounted on the housing 320 by a stud 388 to dispose a hook portion 390 between the inner end of the knob 374 and the end wall of the housing 320. The lower end of the latch member 386 is connected to the flexible cable 210 which passes through the internal openings 389 and 390 in the control base member 185.

As in the case of the main control valve assembly, the emergency valve unit 184 is shown in FIGURE 14 in its at rest position in the absence of the application of fluid pressure, the effects of which will be described in connection with the description of operation of the overall system.

The pressure multiplier 186 shown in detail in FIGURE 13 comprises a main cylindrical housing member 392 having a peripheral flange 394 for attachment to the base assembly 180 and an internal bore 396 in which a piston 398 is slidably received. The piston 398 is normally urged by compression spring 400 against the shoulder 402 formed on the lower end of a central hollow rod 404, the upper end of which extends through the top of the housing member 392, the rod being held in place by a snap ring 406. O-rings 408 and 410 form sealed concentric chambers 412 and 414, respectively, the former being in communication with the opening 340 in the control base 180 and the latter being in communication with an additional opening 416 in the base assembly. The opening 416 is in communication through an internal channel 418 with the housing opening 188 leading to the throttle control chamber in the hydrokinetic brake. Chamber 414 within the interior of the rod 404 is connected through radial openings 420 to the chamber 422 formed by a bore 424 in which an extension 426 of the piston 398 is slidably received. Suitable O-rings 427, 428, 430 and 432 are provided to seal the several chambers. The space between the bore 396 and the piston 398 is vented through a filter 434.

*Operation*

As mentioned above, the hydrokinetic brake system of the present invention is so integrated with the standard friction brake system that the hydrokinetic brake is always called upon first to do all of the braking it can and the usual friction brakes are actuated only to supply the missing braking effort under conditions when the hydrokinetic brake cannot fully meet the demand.

Under all normal conditions at road speeds above, for example, 10 m.p.h., the hydrokinetic brake will perform the entire braking function. However there are four conditions under which the hydrokinetic brake cannot supply the full braking effort and its action must be supplemented or replaced by the action of the friction brakes.

The first of these conditions arises when the total braking effort required exceeds the torque which can be applied by the hydrokinetic brake to the vehicle propeller shaft without breaking it. Under this condition the amount of braking effort exerted by the hydrokinetic brake is automatically limited to a value which can be transmitted safely through the propeller shaft and provision is made for automatically transferring the remaining braking function to the usual friction brakes.

The second condition arises if, for any reason, the hydrokinetic brake system fails, for example due to a complete loss of water or due to breakage of the propeller drive shaft or the rear axle. In this case the entire braking function is automatically transferred to the standard friction brakes.

Since the braking effort exerted by the hydrokinetic brake of the present invention is proportional to vehicle speed and the brake is thus ideally suited for applying maximum braking effort when it is needed most, i.e. when the vehicle is travelling at relatively high speed, nevertheless when the speed of the vehicle is decreased to a range of 10 to 15 m.p.h., the capacity of the hydrokinetic brake drops to a point where acting alone it cannot stop the vehicle or reduce its speed fast enough. Under these conditions the novel control system of the present invention automatically shifts part of the braking function to the friction brakes.

The fourth limitation upon the hydrokinetic brake unit is that imposed by the heat dissipating capacity of the vehicle radiator.

Under certain conditions, for example when the truck is travelling down a long steep grade with a speed in excess of 50 m.p.h., the retarding force required of the hydrokinetic brake is well within the capacity of the brake itself and of the propeller shaft. However, heat generated by the hydrokinetic brake is beyond the capacity of the vehicle radiator to dissipate. Under these conditions the temperature of the water in the circulating system will continue to rise. If it appears that a safe water temperature will be exceeded, the operator must slow the vehicle to a speed at which the energy to be dissipated is within the capacity of the radiator. If he does not, vapor lock will occur and the hydrokinetic brake torque will drop sharply. Again the missing brake action is automatically transferred to the friction brakes.

The operation of the system will now be considered assuming normal conditions where the total braking effort required is within the capacity of the hydrokinetic brake, propeller shaft and the vehicle radiator.

When the vehicle is travelling under conditions which require no braking effort, the components of the main control valve 182, the emergency valve 184 and the pressure multiplier 186 will occupy the position shown in the drawings and the throttle member 156 of the hydrokinetic brake will occupy the position shown in dotted lines in FIGURE 6 to which it is urged by the spring 172. The movement of the throttle ring to this position is facilitated by a check valve 436 mounted in the member 150 (FIGURE 6) and arranged to permit flow from the chamber 170 through a passage 438 to the low pressure core region of the brake.

If it is desired to slow the vehicle or to limit its speed on a steep grade, the operator will depress the foot pedal 40 in the usual manner thus opening valve 38 to supply pressure in line 42 in an amount proportional to the depression of the pedal 40. The actuating air enters the control base 180 through the port 195 and passes through the passage 248 and opening 238 to the port 228 in the main control valve 182, then through the bore 294 in the plate 288 out through the opening 230 and through port 240 thence through channel 250 in the base through the opening 251 and through port 328 in the emergency valve. At the same time air under pressure is applied to the right side of piston 298 and valve 282 without changing their positions. The air then passes through the plunger 366 out through the opening 326 in the base of the emergency valve, thence through opening 332, channel 338, and opening 340 in the base to the chamber 412 formed at the underside of piston 398 in the pressure multiplier 186. The piston 398 is urged upwardly thus decreasing the effective size of water chamber 412 forcing a portion of the water out through the center of the tube 404 through the passages described above to the control chamber 170 in the hydrokinetic brake.

As the pressure in the chamber 170 is thus increased, the throttle 156 is moved to the right as viewed in FIGURE 6 thus permitting the water which fills the working chamber 124 of the hydrokinetic brake to flow from the area of the rotor blades to the area of the stator blades. Through the action described above a retarding torque is immediately exerted on the propeller shaft by the hydrokinetic unit. The pressure in the main working chamber 124 increases substantially instantaneously. This pressure rise begins to operate the turbopump unit 88 to supply water under pressure to the hydrokinetic unit at a pressure slightly in excess of atmospheric pressure. Also at this time, the pressure in the working chamber 124 is transmitted through the passages described above in to the water chamber 308 through ports 236 and 226 in the main control valve 182 where it tends to urge the piston 298 to the right because of the difference in area enclosed by the seals 304 and 306. If the hydraulic pressure in chamber 308, which is proportional to the braking effort exerted by the hydrokinetic brake, plus the force of spring 314 are sufficient to balance the opposing air pressure and the force developed by spring 312, the components of the control valve 182 will continue to remain in the position shown in FIGURE 12 and the total braking effort will be supplied by the hydrokinetic unit. If the operator then releases the brake, the pressure in line 42 will drop to atmospheric, the piston 398 in the pressure multiplier will return to its limit position thus reducing the pressure in the control chamber 170 in the hydrokinetic brake to its initial value permitting the throttle 156 to close under the influence of spring 172 thus effectively releasing the brake.

As the piston 398 is returned to its limit position under the influence of strong spring 400, water will be drawn into the chamber 422 through the check valve 208, through the internal passages 246 and 244 in the control base 180 which passages are in constant communication with the main vehicle water system. Makeup water is thus automatically supplied.

Now let it be assumed that the brake has been applied and that the hydrokinetic brake is supplying the total braking effort as previously described and that as a result of the braking effort the speed of the vehicle is reduced to a point where the hydrokinetic brake is no longer effective to supply the total braking effort. Under these conditions the water pressure in the main working chamber 124 of the hydrokinetic unit will drop thus reducing the pressure in the chamber 308 of the main control valve 182. Since the opposing actuating brake pressure is constant with a constant setting of the brake pedal 40, continued reduction of the hydraulic pressure in chamber 308 will eventually permit the piston 298 and the valve 282 to move to the left as viewed in FIGURE 12. This movement will continue until the valve element 316 seats against the member 318 thus closing the atmospheric vent to the friction brake air cylinders.

Thereafter continued movement of the piston 298 to the left will break the seal at 302 and permit the passage of the main actuating air through port 224, opening 234, internal passage 242, and opening 199 in the control base to the normal friction brake air cylinder to establish a braking effort there which is proportional to the applied air pressure which in turn is proportional to the depression of the pedal 40. This action in turn increases the air pressure at the left of the piston 298. When this pressure rises sufficiently to move the piston 298 to the right, the seal will be again established by the member 302, and the air pressure applied to the friction brakes will remain constant. If the pressure in the working chamber 124 of the hydrokinetic brake again drops due to a decrease in vehicle sped, the piston 298 will again move to the left and allow more air to pass into the friction brake chambers to increase the braking effort exerted by the friction brakes by an amount exactly corresponding to the reduction in braking effort exerted by the hydrokinetic unit as reflected by the drop in the hydraulic pressure in chamber 308 of the control valve 182.

Thus, as the braking effort of the hydrokinetic brake is reduced, the braking effort exerted by the normal friction brakes is increased automatically without any change in actuating air pressure or brake pedal depression. Accordingly the shift from the hydrokinetic brake to the friction brakes is accomplished automatically without any change which is apparent to the vehicle operator. Finally, as the vehicle comes to a stop, pressure in chamber 124 and the pressure in the corresponding chamber 308 in the valve unit will drop to zero, the air pressure delivered to the friction brakes will be the same as the air pressure which would have been applied had the hydrokinetic system not been included in the system, except for a very small difference caused by the spring 312. Thus the total braking effort is exerted solely by the friction brakes alone when the vehicle has been stopped.

It is an important feature of the present invention that this same action occurs, i.e. transferring of the braking effort to the friction brakes, when for any reason the hydrokinetic brake becomes ineffective. For example, if all water is lost from the system, the pressure in the chamber 308 will drop to zero thus permitting the full application of the friction brakes. Also in the event of failure of the rear axle or propeller shaft, the rotor within the hydrokinetic unit will stop and the hydraulic pressure applied to the control valve 182 will again fall to zero with the same result.

When the brake pedal is released, the spring 314 and the air pressure enclosed in the friction brake air cylinder will return the components of the control valve 182 to the position shown in FIGURE 12 thus opening the seal established by the member 316 of the valve 282 and releasing the friction brakes.

At all times when the total braking effort is within the range of the hydrokinetic unit, the friction brakes will be completely de-energized. The throttle 156 will occupy an equilibrium position in which the braking effort exerted by the hydrokinetic unit corresponds exactly to the brake pedal depression by which the vehicle operator calls for specific braking effort. If the vehicle speed drops while staying within the range of the hydrokinetic unit, the pressure in the working chamber 124 of the hydrokinetic brake drops. This unbalances the throttle equilibrium and the throttle starts moving to the right as viewed in FIGURE 6 thus causing the working water pressure to rise again and the system will reach equilibrium with the throttle valve open slightly more than before. Since the equilibrium condition is reached with the same water pressure as before, it follows that the retarding torque developed by the hydrokinetic brake is unchanged. Accordingly, the braking effort exerted by the hydrokinetic brake remains constant as the speed goes down until the throttle is fully opened. Thereafter the friction brakes are increasingly energized as described above.

Under certain conditions, for example, when the vehicle is travelling at high speed and emergency conditions arise which cause the vehicle operator to depress the pedal 40 excessively, the retarding torque exerted by the hydrokinetic unit would be sufficient to snap the propeller shaft except for the torque limiting device included in the present invention, the action of which will now be described. Under the conditions just described, the value of the actuating air pressure acting on the piston 272 in the control valve 182 will overcome the force of spring 274 thus moving this piston to the right. Valve 280 follows the piston 272 because of the action of the spring 310 until the valve seal 296 rests against the plate 288 thus preventing the further application of pressure through the port 230 and the emergency valve 184 to the pressure multiplier 186 through the pathway previously described. This action in turn limits the pressure applied to the throttle control chamber 170 of the hydrokinetic brake and thus limits the extent to which the throttle 156 is moved in an opening direction. In effect, the force acting to move the throttle in an opening direction has been limited to an exact predetermined maximum determined by the force of spring 274. Accordingly the maximum value of the water pressure in working chamber 124 is also limited thus limiting the maximum torque which can be developed in the hydrokinetic brake. Thus irrespective of speed or the extent of brake pedal depression, this limit torque can never be exceeded. Since the maximum torque value is determined by the strength of the propeller shaft, in every installation a spring 274 having a strength correlated to the strength of the propeller shaft will be installed.

The closing of the valve seal 296 has the effect of limiting the pressure in the chamber 308 in the main control valve 182. However the opposing actuating air pressure continues to rise thus displacing the piston 298 to the left as viewed in FIGURE 12 and thus delivering actuating air to the standard friction brakes as previously described. The pressure of this air is again modulated to cause the wheel brakes to apply only the difference between the braking effort demanded by the driver and that applied by the hydrokinetic brake.

Emergency Operation

The brake system of the present invention also provides for operation of a hydrokinetic brake when the main air pressure has been lost due to failure of the compressor or breakage in the air brake lines. Under these conditions neither the hydrokinetic brake nor the standard friction brakes can be operated as heretofore described. Under these conditions, the operation of the hydrokinetic brake is effected by operation of the emergency valve 184 which disconnects the entire system from the main brake lines and permits energization of the hydrokinetic brake with the air stored in the emergency air tank 202.

First it should be noted that during each normal application of the brakes the valve member 358 in the emergency control valve 184 is displaced to the left against the balancing spring 368 permitting air to pass from the emergency valve through the port 324 thus through the opening 330, the internal passage 336 and the opening 194 in the control base 180 thence through the line 200 to the emergency tank. As the air pressure is released at the end of the braking operation, the valve member 358 moves to the right thus isolating the emergency tank. Thus if the emergency tank is originally empty, it will be filled after the first normal brake operation and thereafter will always hold a normally isolated supply of air under pressure.

If the main air supply should fail, the hydrokinetic brake may be actuated by manipulation of a knob 440 connected to the control cable 210 and preferably located on the dashboard of the vehicle. Displacement of the control cable 210 will rock the lever 386 out of engagement with the end of the knob 374 thus permitting the plunger 366 to move to the left as viewed in FIGURE 14 under the influence of spring 384. As the plunger 366 moves to the left, it engages the valve 358, the sealing member 362 of which closes the passage 380 in the plunger thus isolating the interior of the emergency control valve 184 from the main air system. Continued movement of the plunger to the left opens the seal 360 and establishes free communication between the ports 324 and 326 in the emergency control valve housing, the former being connected to the emergency tank and the latter being connected to the pressure multiplier 186. The supply of air to the pressure multiplier 186 will thus actuate the hydrokinetic brake exactly in the manner previously described. Since the main wheel brakes are not actuated, the vehicle will not stop if it is on a steep grade but will be held to a safe speed. On level ground it will eventually stop due to the road friction. It is important to note that the hydrokinetic brakes will never prevent motion of the vehicle which always can be operated under its own power at very low speeds. Thus if the emergency brake is actuated and the vehicle comes to a stop in a dangerous location such as a railroad crossing or intersection, the driver can always move the vehicle to a safe area. For final stopping and parking the driver can use the standard hand-operated mechanical parking brake normally provided in such vehicles. To reset the emergency valve the driver must leave the vehicle and pull the knob 374 out manually. The latch 386 will re-engage due to the retracting spring provided on the cable 210.

It is to be noted that the actuation of the emergency brake can never cause a braking force in excess of the maximum safe load on the propeller shaft 22, since the maximum air pressure in the emergency air tank is limited by the spring 274 in the same manner as the maximum air pressure that can be applied during normal operation. However provision is also made to guard against the development of excessive pressure in the emergency tank which might be caused by thermal expansion. For this purpose the valve 364 in the emergency valve assembly 184 has been provided and is normally held closed by the spring 370. If the pressure in the emergency tank should under any circumstances become higher than desired, the valve 364 will be moved to the right against the action of the calibrated spring 370 permitting the excessive pressure to bleed out of the system through the port 328 in the emergency valve housing. If the air remaining in the emergency tank should become cooler and thus establish a lower pressure than desired, the next succeeding normal brake operation would again restore the air pressure to the desired level as previously described.

As an additional safety measure a warning light may be included in the system to provide a visual indication to the driver whenever the friction brakes are actuated. The warning light is preferably actuated by a pressure switch connected to the main brake line 44 and its operation is identical to that of the normal brake light now in universal use in automotive applications. Such a light would prove particularly beneficial, for example, if the vehicle were travelling down a grade at a speed in excess of that which normal friction brakes could safely control but a speed well within the capacity of the hydrokinetic brakes. The failure of the hydrokinetic brake for any reason accompanied by the automatic shift to the friction brakes would immediately be apparent to the driver of the vehicle. The vehicle operator could then bring the vehicle to a stop or bring the speed of the vehicle within the range safely controllable by the friction brakes. If this action were taken immediately upon the operation of the warning light, the friction brakes would be cool and capable of providing the desired retarding action.

The dual brake system of the present invention has several advantages of practical significance in addition to those discussed in detail above. For example the hydrokinetic brake can never operate to lock the rear wheels of the truck-tractor unit regardless of the speed or extent of the depression of the brake pedal 40. Even when the emergency valve is tripped, the hydrokinetic brake will exert a strong retarding force but is inherently incapable of locking the wheels to which it is connected. Accordingly, the possibility of skidding, loss of braking traction with the accompanying difficulties in vehicle control are entirely avoided.

The hydrokinetic brakes of the present invention also have an extraordinarily low wear rate. Actual experience has demonstrated that the maintenance requirements for the hydrokinetic brakes are very low and the cost of the operation is only slightly in excess of the depreciation of the first cost and installation which is also low. Based on actual figures for these costs and for normal brake maintenance and wear, it has been established that the brake system of the present invention pays for itself in one or two years of operation.

Also because of the control of the capacity of the hydrokinetic brake by means of an internal throttle rather than by partially draining or filling the unit as is the case in prior systems, the need for a water storage tank is entirely eliminated thus reducing the weight and complication of the installation as compared to prior systems.

Since the hydrokinetic brake of the present invention is entirely free of cavitation, it can be made completely out of aluminum. In prior units the problems associated with cavitation necessitated the use of heavy cast-iron constructions or the use of oil as the operating fluid thus requiring a separate oil system. For this and other reasons, it has been found that the weight of the installation of the present unit is about ¼ the weight of the best presently available hydraulic system.

Finally, since the operating fluid for the hydrokinetic brake is water taken from the vehicle cooling system, it is automatically protected against cold weather damage whenever such protection is provided for the cooling system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle having a water-cooled engine connected to a driving wheel through a propeller shaft and a radiator for cooling said engine, said vehicle also having a frame with side rails, a hydrokinetic brake having a water filled housing; means mounting said housing on said side rails to hold said housing against rotation while permitting lateral and vertical movement of said housing with respect to said rails; a rotary assembly in said housing secured to said propeller shaft, stator vanes rigid with said housing, rotor vanes rotatable with said rotor assembly, said vanes cooperating to exert a retarding torque on said propeller shaft and to raise the temperature of the water in said housing, brake control means to adjust the effective action of said vanes, and means connecting said housing to said radiator to dissipate the heat generated in said housing in said radiator.

2. In a vehicle having a frame with side rails and an engine connected to driving wheels by a propeller shaft comprising a hydrokinetic brake assembly having a housing and a hollow rotor, means securing said rotor to said propeller shaft for rotation therewith, and support means mounting said housing on said side rails, said support means being effective to hold said housing against rotation while permitting lateral and vertical shifting movement of said housing with respect to said side rails.

3. In a vehicle having a frame provided with side rails and an engine connected to driving wheels by a propeller shaft comprising a hydrokinetic brake assembly having a housing and a hollow rotor, an adapter rigid with said propeller shaft, means securing said rotor to said adapter, torque absorbing means carried by said rails, and means connecting said housing to said torque absorbing means, said torque absorbing means being effective to hold said housing against rotation while permitting lateral and vertical shifting movement of said housing with respect to said rails.

4. In a vehicle having a frame provided with side rails and an engine connected to driving wheels by a propeller shaft comprising a hydrokinetic brake assembly having a housing and a hollow rotor, an adapter welded to said propeller shaft, means securing said rotor to said adapter whereby said rotor rotates with said propeller shaft, a torque member carried by said side rails and extending transversely thereof, and means connecting opposite sides of said housing to said torque member at spaced points therealong, said last mentioned means being effective to prevent rotation of said housing while permitting limited lateral and vertical shifting movement of said housing.

5. In a vehicle having a frame and an engine connected to driving wheels by a propeller shaft comprising, a hydrokinetic brake assembly having a housing and a hollow rotor, an adapter rigid with said propeller shaft, means securing said rotor to said adapter, torque absorbing means carried by said frame, and means connecting said housing to said torque absorbing means, said torque absorbing means being effective to hold said housing against rotation while permitting lateral and vertical shifting movement of said housing with respect to said frame.

6. In a vehicle having a frame and an engine connected to driving wheels by a propeller shaft comprising, a hydrokinetic brake assembly having a housing and a hollow rotor, means securing said rotor to said propeller shaft for rotation therewith, a torque member carried by said frame and extending laterally thereof, and means connecting opposite sides of said housing to said torque member at spaced points therealong, said last mentioned means being effective to prevent rotation of said housing while permitting limited lateral and vertical shifting movement of said housing with respect to said frame.

References Cited in the file of this patent

UNITED STATES PATENTS

| | | |
|---|---|---|
| 2,177,511 | Aikman | Oct. 24, 1939 |
| 2,241,189 | Dick | May 6, 1941 |
| 2,290,932 | Aikman | July 28, 1942 |
| 2,790,518 | Wilson | Apr. 30, 1957 |
| 2,963,117 | McGill | Dec. 6, 1960 |
| 2,963,328 | Lucien | Dec. 6, 1960 |